No. 884,258. PATENTED APR. 7, 1908.
F. BAKER.
WEED CUTTER AND CULTIVATOR.
APPLICATION FILED SEPT. 5, 1907.
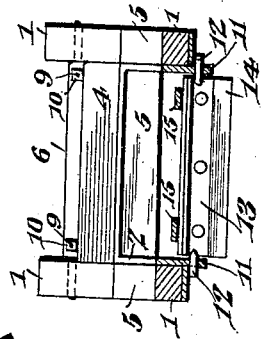
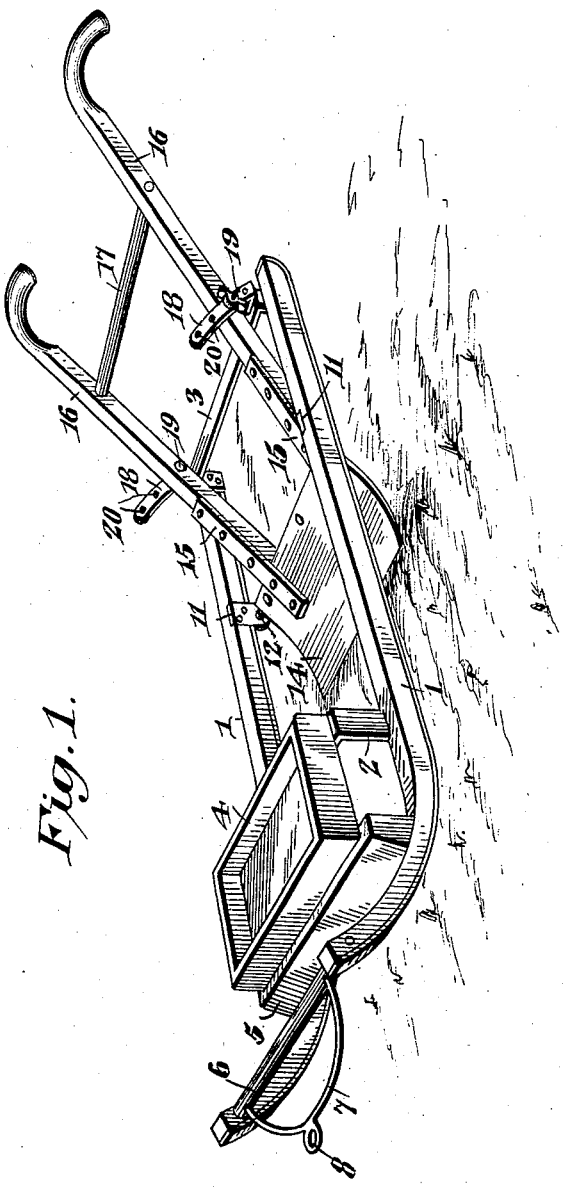
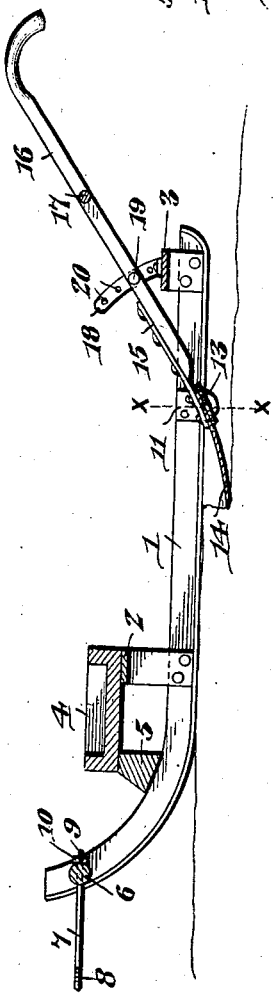
Frank Baker, Inventor
Witnesses

UNITED STATES PATENT OFFICE.

FRANK BAKER, OF SPARTA, KENTUCKY.

WEED-CUTTER AND CULTIVATOR.

No. 884,258.     Specification of Letters Patent.     Patented April 7, 1908.

Application filed September 5, 1907. Serial No. 391,458.

*To all whom it may concern:*

Be it known that I, FRANK BAKER, a citizen of the United States, residing at Sparta, in the county of Gallatin and State of Kentucky, have invented a new and useful Weed-Cutter and Cultivator, of which the following is a specification.

The invention relates to a combined weed cutter and cultivator.

The object of the present invention is to improve the construction of weed cutters, and to provide a combined weed cutter and cultivator designed particularly for use between rows of plants, and adapted to throw a portion of the soil to each side of it next to the plants under cultivation.

A further object of the invention is to provide a combined weed cutter and cultivator, adapted to be easily operated and guided, and capable of ready adjustment to cause it to run either deep or shallow.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a combined weed cutter and cultivator, constructed in accordance with this invention. Fig. 2 is a central longitudinal sectional view of the same. Fig. 3 is a transverse sectional view, taken substantially on the line $x$—$x$ of Fig. 2.

Like numerals of reference designate corresponding parts in all the figures of the drawing.

The frame of the combined weed cutter and cultivator embodies a pair of runners 1, connected at a point in advance of the center and at their rear ends by arched metallic bars 2 and 3, having their terminals bent downwardly at right angles and secured by suitable fastening devices to the inner faces of the runners. The arched bar 2 forms a support for the rear portion of a weight receptacle 4, which is also supported at the front portion by a transverse bar or member 5. The transverse bar or member 5 also connects the runners, and is suitably secured to the upper faces of the same. The weight receptacle is preferably in the form of an open box, as shown, and it extends transversely of the front portion of the combined cultivator and weed cutter, and it is adapted to receive a weight when the character of the soil requires the same, as hereinafter more fully explained. The weight may consist of any heavy substance, such as a rock, pieces of iron, or the like. The runners are connected at their front terminals by a transverse rod or bar 6 to which is secured a draft attachment 7 for enabling a draft animal to be conveniently hitched to the combined weed cutter and cultivator. The draft attachment, which is approximately semi-circular, may be constructed of rod metal, or other suitable material, and it is provided with a central eye 8, and its terminals 9 pierce the rod or bar 6 and are equipped with nuts 10 for engaging the latter. The bar 6 is pivotally mounted between the front ends of the runners, and the draft attachment is adapted to swing upwardly and downwardly. The eye 8 enables a horse or other draft animal to be readily hitched to the weed cutter and cultivator.

The runners are provided at a point in rear of the receptacle with bearing plates 11, having depending portions provided with bearing openings, and receiving terminal pivots or journals 12 of a transverse bar 13 to which a blade 14 is secured by rivets, or other suitable fastening means. The blade, which extends downwardly and forwardly from the transverse bar 13, is curved slightly and is provided with a front cutting edge, and it is designed to be arranged at different angles or inclinations to cause it to run either deep or shallow. The upper portion of the blade is connected by metallic straps or pieces 15 with plow handles 16, preferably constructed of wood and extending upwardly and rearwardly from the blade, as clearly illustrated in Figs. 1 and 2 of the drawing. The handles, which are connected at their upper portions by a transverse rung 17, are adjustably secured to the rear transverse bar 3 by means of arcuate arms 18 and bolts 19. The arcuate arms, which extend upwardly and forwardly from the bar 3, are provided at their lower ends with inwardly extending attaching portions, and they have perforations 20 arranged at intervals and adapted to receive the bolts 19. The bolts 19, which pierce the handles, are adapted to be arranged in any of the perforations 20 of the arcuate arm, and they are preferably equipped with winged nuts for clamping the parts in their adjustment. By adjusting the handles, the blade 14 may be set at the desired angle or inclination.

When the apparatus is drawn forwardly between two rows of plants, it cuts down the weeds and also cuts a layer of soil, which is forced upwardly over the blade, and a portion of the soil falls over the runners, and is thereby discharged next to the plants under cultivation. When the soil is dry or hard, a weight may be placed in the weight receptacle to assist in holding the blade in the ground, and when the soil is soft, the apparatus may be lightened by removing the weight from the receptacle. Also the weight may be adjusted to suit the character of the soil.

The combined weed cutter and cultivator is easily guided, and although in the accompanying drawings is illustrated a construction adapted to travel between two rows of plants, yet it will be readily apparent that the combined weed cutter and cultivator may be made double, so as to straddle a row and operate in the space between the same and the adjacent rows.

Having thus fully described my invention, what I claim as new and desire to secure by Letters Patent, is:—

1. A combined weed cutter and cultivator comprising an oblong frame embodying spaced runners, a weight receptacle arranged at the front of the frame and connected with the front portions of the runners, and a blade pivoted between the rear portions of the runners and provided with rearwardly extending handles.

2. A combined weed cutter and cultivator comprising an oblong frame embodying spaced runners, a weight receptacle having supporting means connected to the front portions of the runners, a blade pivoted between the rear portions of the runners and provided with rearwardly extending handles, and means for adjustably connecting the handles with the rear portion of the frame for securing the blade in its adjustment.

3. A combined weed cutter and cultivator comprising an oblong frame embodying spaced runners, a weight receptacle provided with supporting means consisting of transverse bars connecting the front portions of the runners, one of the transverse bars being arched, and a blade pivoted between the rear portions of the runners and provided with rearwardly extending handles.

4. A combined weed cutter and cultivator comprising a frame provided with runners, an inclined blade connected with the runners and extending downwardly and forwardly therefrom, said blade being arranged to sever a layer of the soil from the ground and adapted to cause the severed soil to be discharged at its upper rear edge, and handles connected with the frame.

5. A combined weed cutter and cultivator comprising a frame provided with runners, a weight receptacle arranged at the front of the frame, an inclined blade pivotally mounted between the runners at the rear portion of the frame and extending downwardly and forwardly therefrom, said blade being arranged to sever a layer of soil from the ground and adapted to cause the severed soil to be discharged at its upper edge, and handles connected with the blade.

6. A combined weed cutter and cultivator comprising an oblong frame embodying spaced runners, an inclined blade pivotally connected with the runners and extending downwardly and forwardly therefrom, said blade being arranged to sever a layer of soil from the ground and adapted to discharge the same at its upper edge, handles connected with and extending rearwardly from the blade, arms mounted on the frame and arranged at an angle to the handles, and means for adjustably securing the handles to the arms for holding the blade in its adjustment.

In testimony, as that I claim the foregoing as my own, I have hereto affixed my signature in the presence of two witnesses.

FRANK BAKER.

Witnesses:
J. J. CONSTANTINE,
WILLIS O. DERELL.